(12) United States Patent
Hynecek et al.

(10) Patent No.: US 10,694,825 B2
(45) Date of Patent: Jun. 30, 2020

(54) TRI-LAYER CASE WITH SHOCK-ABSORBING IMPACT GEOMETRY

(71) Applicant: Samsonite IP Holdings S.àr.l., Luxembourg (LU)

(72) Inventors: Bryan Hynecek, Redwood City, CA (US); Randy Yang Chiang, San Mateo, CA (US); Jon Dukershein, Pacifica, CA (US); Darrick Albert Del Moral, San Bruno, CA (US); Kenny Robert Denike, San Francisco, CA (US)

(73) Assignee: Samsonite IP Holdings S.àr.l., Luxembourg (LU)

( * ) Notice: Subject to any disclaimer, the term of this patent is extended or adjusted under 35 U.S.C. 154(b) by 15 days.

(21) Appl. No.: 15/699,881

(22) Filed: Sep. 8, 2017

(65) Prior Publication Data
US 2019/0075900 A1    Mar. 14, 2019

(51) Int. Cl.
| *B65D 81/02* | (2006.01) |
| *A45C 11/00* | (2006.01) |
| *H04M 1/18* | (2006.01) |
| *H04M 1/17* | (2006.01) |

(52) U.S. Cl.
CPC .............. *A45C 11/00* (2013.01); *H04M 1/185* (2013.01); *A45C 2011/001* (2013.01); *A45C 2011/002* (2013.01); *A45C 2011/003* (2013.01); *B65D 81/02* (2013.01); *H04M 1/17* (2013.01)

(58) Field of Classification Search
CPC .................. B65D 81/02; A45C 11/00; A45C 2011/001–003; A45C 13/002; A45C 13/36; G06F 1/16; H04B 1/3888; H04B 1/02; H04B 1/18

USPC ...................... 206/37, 305, 320; 361/679.01; 455/575.1, 575.8
See application file for complete search history.

(56) References Cited

U.S. PATENT DOCUMENTS

| 5,265,720 A | 11/1993 | Meliconi |
| 7,093,717 B2 | 8/2006 | Sakai et al. |
| D669,458 S | 10/2012 | Wilson et al. |
(Continued)

FOREIGN PATENT DOCUMENTS

WO    2012149304 A1    11/2012

OTHER PUBLICATIONS

Extended European Search Report and Written Opinion for EP Application No. 18193164.3, dated Feb. 12, 2019.
(Continued)

*Primary Examiner* — Luan K Bui
(74) *Attorney, Agent, or Firm* — Lerner, David, Littenberg, Krumholz & Mentlik, LLP

(57) ABSTRACT

A case for a mobile device, including a first layer, a second layer, and a third layer. The first layer is formed from an elastomeric first material. The second layer is formed from a second material different from the elastomeric first material. The third layer is formed from an elastomeric third material different from the second material. The second layer is arranged between the first layer and the third layer, with the first layer arranged on an outside of the case and the third layer being arranged on an inside of the case so that the third layer is closer to the mobile device than the first layer when the mobile device is arranged in the case. At least one outer surface of the first layer includes an antimicrobial substance or treatment.

18 Claims, 7 Drawing Sheets

(56) References Cited

U.S. PATENT DOCUMENTS

| | | | |
|---|---|---|---|
| 8,579,112 B2* | 11/2013 | Bethea | A45F 5/00 |
| | | | 206/320 |
| D706,255 S | 6/2014 | Akana et al. | |
| 8,770,402 B2 | 7/2014 | Bergreen et al. | |
| D719,559 S | 12/2014 | Dukerschein et al. | |
| D720,735 S | 1/2015 | Turocy | |
| D721,360 S | 1/2015 | Laffon de Mazieres et al. | |
| D721,687 S | 1/2015 | To et al. | |
| D725,091 S | 3/2015 | Wen | |
| D728,468 S | 5/2015 | Ferber et al. | |
| 9,060,580 B2 | 6/2015 | Tages | |
| D740,798 S | 10/2015 | Poon et al. | |
| D747,707 S | 1/2016 | Roberts et al. | |
| D747,708 S | 1/2016 | Roberts et al. | |
| D753,641 S | 4/2016 | Roberts et al. | |
| D754,651 S | 4/2016 | Roberts et al. | |
| D754,652 S | 4/2016 | Roberts et al. | |
| D756,344 S | 5/2016 | Roberts et al. | |
| D757,702 S | 5/2016 | Kanazawa | |
| D757,703 S | 5/2016 | Kanazawa | |
| D757,704 S | 5/2016 | Roberts et al. | |
| D763,841 S | 8/2016 | Kim | |
| D772,854 S | 11/2016 | Igarashi | |
| D775,615 S | 1/2017 | Tien | |
| D776,100 S | 1/2017 | Igarashi | |
| D776,645 S | 1/2017 | Del Moral et al. | |
| D777,715 S | 1/2017 | Sawaya | |
| 9,545,140 B1* | 1/2017 | Johnson | A45C 11/00 |
| D778,271 S | 2/2017 | Stump et al. | |
| D779,470 S | 2/2017 | Kim et al. | |
| 9,615,476 B2 | 4/2017 | Rayner et al. | |
| D786,232 S | 5/2017 | Kim et al. | |
| D789,344 S | 6/2017 | Kim | |
| 9,872,546 B2 | 1/2018 | Kim | |
| D814,453 S | 4/2018 | Chiang et al. | |
| 10,027,783 B2 | 7/2018 | Dukerschein et al. | |
| 10,362,846 B2 | 7/2019 | Denike et al. | |
| 2004/0154941 A1* | 8/2004 | Montler | H01H 9/0242 |
| | | | 206/320 |
| 2010/0096284 A1* | 4/2010 | Bau | H04B 1/3888 |
| | | | 206/320 |
| 2012/0008880 A1* | 1/2012 | Toth | A45C 11/00 |
| | | | 383/42 |
| 2012/0103844 A1* | 5/2012 | Piedra | A45F 5/021 |
| | | | 206/320 |
| 2012/0261289 A1* | 10/2012 | Wyner | A45C 11/00 |
| | | | 206/320 |
| 2012/0325720 A1* | 12/2012 | Tages | H04B 1/3888 |
| | | | 206/522 |
| 2013/0105354 A1 | 5/2013 | Wyner et al. | |
| 2013/0175186 A1* | 7/2013 | Simmer | G06F 1/1626 |
| | | | 206/37 |
| 2013/0193006 A1* | 8/2013 | Bergreen | A45C 11/22 |
| | | | 206/37 |
| 2014/0034531 A1* | 2/2014 | Wang | H04B 1/3883 |
| | | | 206/320 |
| 2014/0069825 A1* | 3/2014 | MacRina | A45C 11/00 |
| | | | 206/37 |
| 2014/0078671 A1 | 3/2014 | Hong | |
| 2014/0116897 A1* | 5/2014 | Wilkey | H04B 1/3888 |
| | | | 206/37 |
| 2014/0274232 A1 | 9/2014 | Tages | |
| 2015/0060309 A1* | 3/2015 | Sartee | A45C 11/00 |
| | | | 206/37 |
| 2015/0068935 A1 | 3/2015 | Kay et al. | |
| 2015/0076187 A1 | 3/2015 | Cohen | |
| 2015/0119118 A1 | 4/2015 | Ashley et al. | |
| 2015/0195929 A1* | 7/2015 | Roberts | A45C 11/00 |
| | | | 428/35.7 |
| 2015/0295617 A1 | 10/2015 | Lai et al. | |
| 2015/0295618 A1* | 10/2015 | Johnson | H04M 1/185 |
| | | | 455/575.8 |
| 2016/0015138 A1 | 1/2016 | Poon et al. | |
| 2016/0058146 A1* | 3/2016 | Baker | A45C 11/00 |
| | | | 224/191 |
| 2016/0094263 A1* | 3/2016 | Fathollahi | H04B 1/3888 |
| | | | 455/575.8 |
| 2016/0113136 A1 | 4/2016 | Shin et al. | |
| 2017/0187853 A1 | 6/2017 | Dukerschein et al. | |
| 2017/0188676 A1 | 7/2017 | Denike et al. | |
| 2018/0289122 A1* | 10/2018 | Lin | A45C 11/00 |
| 2018/0332724 A1* | 11/2018 | Roberts | H05K 5/0221 |
| 2019/0013832 A1* | 1/2019 | Mody | H04M 1/0202 |

OTHER PUBLICATIONS

European Search Report for EP18193156 dated Jan. 18, 2019.

Incipio DualPro Case, posted at amazon.com, posting date not given, [online], [site visited Jul. 20, 2017]. Available from Internet,<URL: https://www.amazon.com/iPhoneIncipio-DualProShockAbsorbing/dp/B01JPIBZUO> (7 pages).

Lohasic 3-In-1 Case, posted at amazon.com, posting date not given, [online], [site visited Jul. 20, 2017]. Available from Internet, <URL: https://www.amazon.com/RoybensAntiScratchAntifingerprintShockproofElectroplate/dp/B01LMWO6DG> (8 pages).

OtterBox Symmetry Case, posted at amazon.com, posting date not given, [online], [site visited Jul. 20, 2017]. Available from Internet, <URL: https://www.amazon.com/OtterBoxSYMMETRY-CaseiPhoneONL Y/dp/801 K6PB3XG/> (11 pages).

Speck iPhone 7 Plus Presidio, posted at amazon.com, posting date Aug. 8, 2016, [online], [site visited Jul. 20, 2017]. Available from Internet, <URL: https://www.amazon.com/SpeckProducts-PresidioPhoneiPhone/dp/B01 JRU57Y2> (10 pages).

* cited by examiner

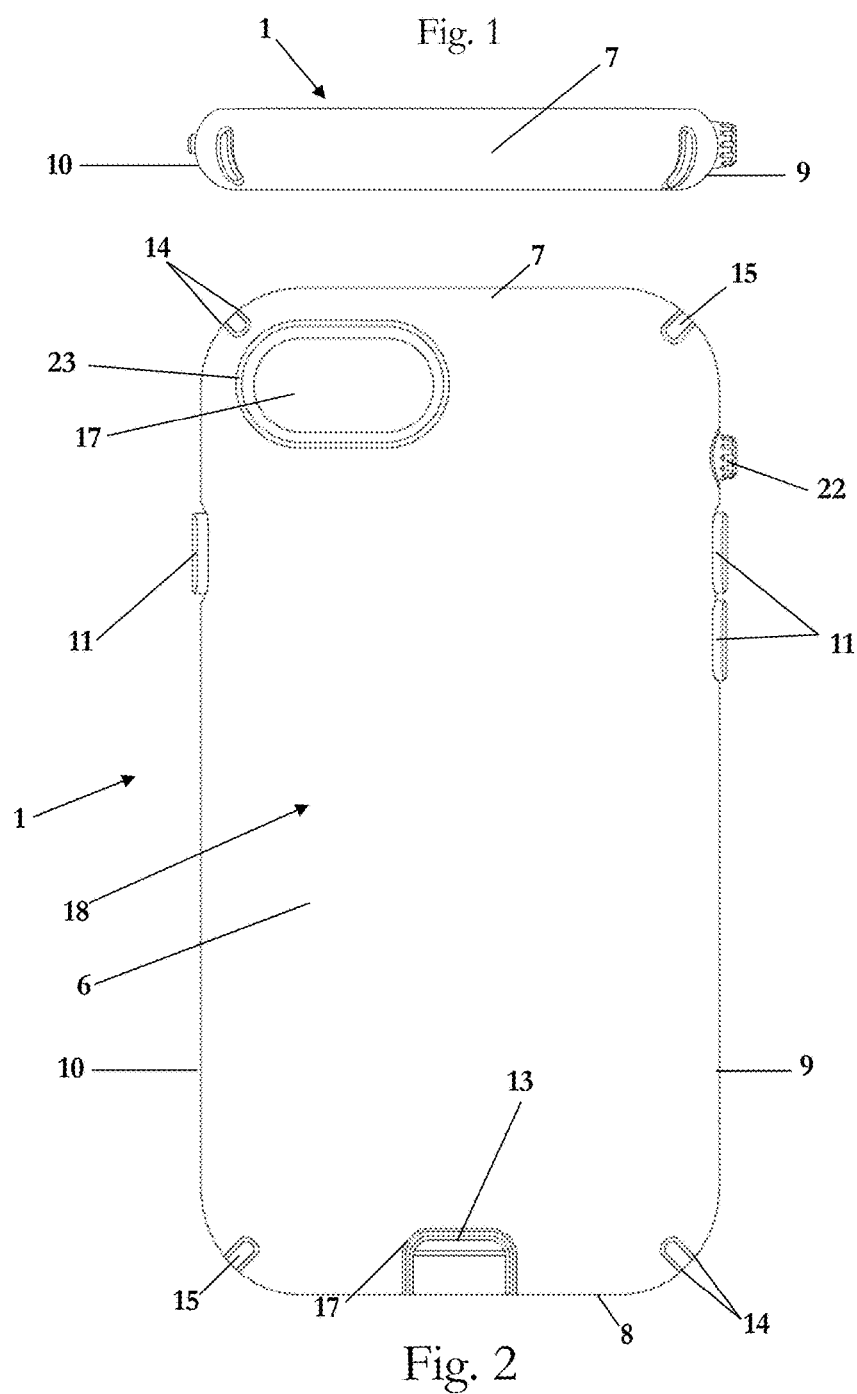

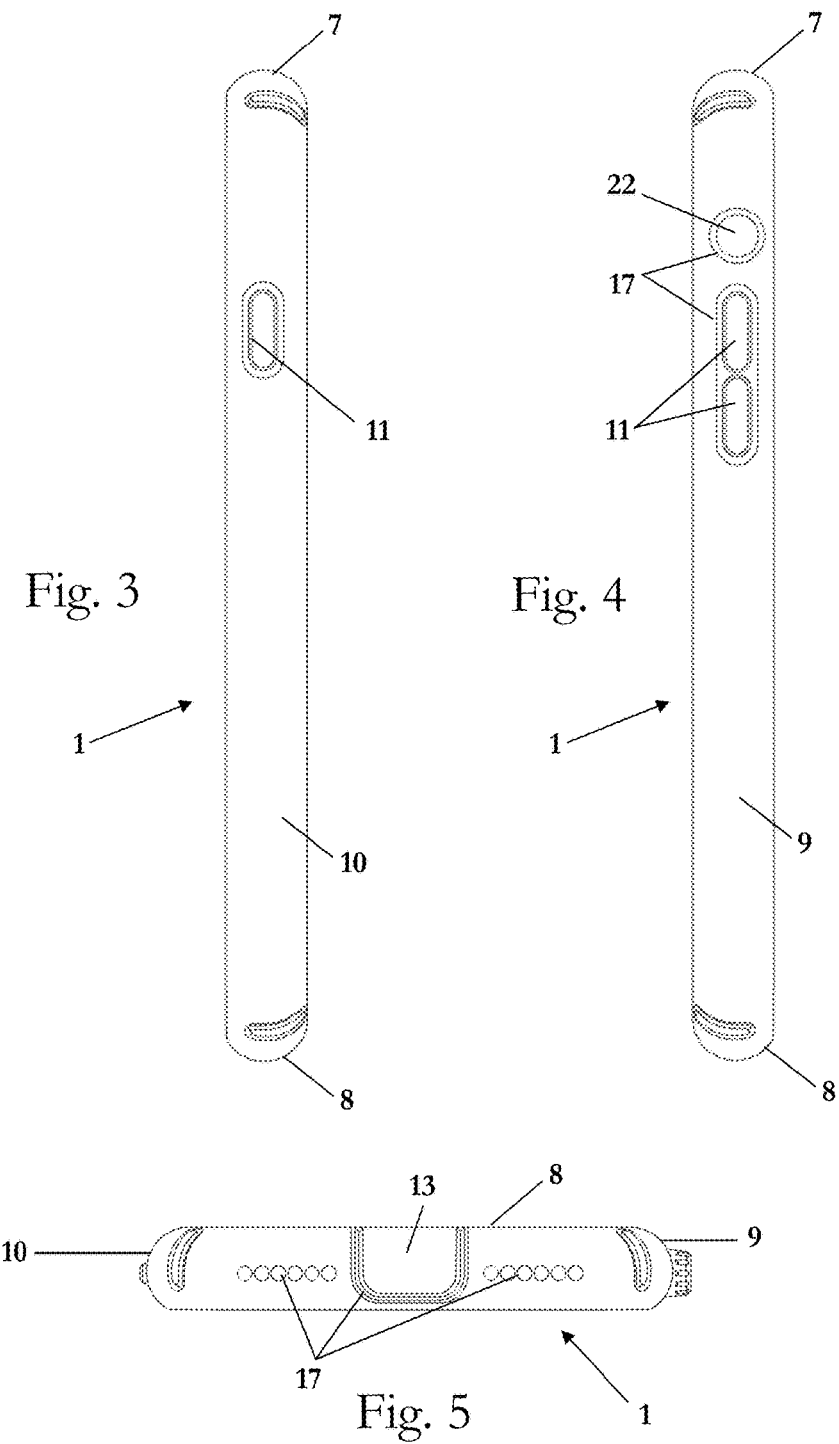

TRI-LAYER CASE WITH SHOCK-ABSORBING IMPACT GEOMETRY

FIELD OF THE INVENTION

The present invention relates to a tri-layer case for a mobile device. The case has a soft inner layer, a hard middle layer, and a soft exterior layer, and includes shock-absorbing impact geometry in the form of triangular ridges that protrude from the inner surface of the sides of the case.

Cases for mobile devices have been designed to provide at least some protection from impact events, such as when the device is dropped, hit, or otherwise struck. In order to provide such protection, materials are often employed which noticeably increase the thickness and weight of the case, and thus impact the portability and ease of use of the resultant protected device. One way to improve the impact protection of a case is to increase the amount of material in the case that provides the impact protection. But this increases the cost of the case in terms of materials, and further increases the size and weight of the case, which is undesirable to users.

US 2015/0195929 discloses a case for a mobile device, the case includes a band arranged to surround the edge of the device. The band includes a layer of flexible polymer. A separate layer of a damping material that is softer than the flexible polymer is provided within the flexible polymer layer. The damping material has a plurality of protrusions projecting inwardly from the inner periphery of the band to engage with the device. But these protrusions are thin semicircular protrusions. While these protrusion do absorb some shock, they are imperfect in that, as the protrusions deform/compress between the mobile device and the rest of the case, the surface area of the protrusions that contact the case to absorb the impact increases very quickly.

SUMMARY OF THE INVENTION

As such, it is desirable to provide a new case for a protective device which can provide increased shock/impact protection to a mobile device without adding significantly to the cost, size, or weight of the case.

According to the present invention there is therefore provided a case for a mobile device as described by way of example below and in the accompanying claims.

In one embodiment of the invention there is provided a case (1) for a mobile device, including a first layer (18), a second layer (2), and a third layer (3). The first layer (18) is formed from an elastomeric first material. The second layer (2) is formed from a second material different from the elastomeric first material. The third layer (3) is formed from an elastomeric third material different from the second material. The second layer (2) is arranged between the first layer (18) and the third layer (3), with the first layer (18) arranged on an outside of the case and the third layer (3) being arranged on an inside of the case so that the third layer (3) is closer to the mobile device than the first layer (18) when the mobile device is arranged in the case (1). At least one outer surface of the first layer (18) includes an antimicrobial substance or treatment.

In another embodiment, the at least one outer surface of the first layer (18) includes an antimicrobial substance selected from the group consisting of silver and silver alloys, copper and copper alloys, organosilanes, quaternary ammonium compounds, chlorhexidine, chlorhexidine incorporated hydroxyapatite materials, chlorhexidine-containing polymers, and antibiotics.

In yet another embodiment, at least part of the at least one outer surface of the first layer (18) is a superhydrophobic surface on which water has a contact angle of >150°.

In a further embodiment, the elastomeric first and second materials are the same or different, with each comprising at least one material selected from the group consisting of thermoplastic elastomers ("TPEs"), thermoplastic polyurethane ("TPU"), silicone, rubber, and combinations thereof.

In yet a further embodiment, the elastomeric first material comprises silicone.

In another embodiment, the second material comprises at least one material selected from the group consisting of hardened plastic materials, rigid or semi-rigid plastic materials, rigid rubber materials, polycarbonate materials, metals, alloys, para-aramid materials, wood, glass, mirror, quartz, and combinations thereof.

In yet another embodiment, wherein the case completely covers the mobile device, except for at least a portion of the front and at least one speaker of the mobile device if present, when the mobile device is arranged in the case.

In a further embodiment, the case further includes a rear side (6), a first side (9), a second side (10), a third side (7), and a fourth side (8). The rear side (6) has an inside surface and an outside surface opposite to the inside surface. The first side (9) extends from the rear side (6) and has an inside surface and an outside surface opposite to the inside surface. The second side (10) extends from the rear side (6) and has an inside surface and an outside surface opposite to the inside surface. The third side (7) extends from the rear side (6) and has an inside surface and an outside surface opposite to the inside surface. The fourth side (8) extends from the rear side (6) and has an inside surface and an outside surface opposite to the inside surface. The inside surface of the first side (9) faces toward the inside surface of the second side (10). The inside surface of the third side (7) faces toward the inside surface of the fourth side (8). The first and second sides (9,10) are arranged between the third and fourth sides (7,8), and the third and fourth sides (7,8) are arranged between the first and second sides (9,10), so that the rear side (6) and the first, second, third, and fourth sides (9,10,7,8) form pocket configured to hold the mobile device. The first layer (18) forms at least part of each of the outside surfaces of the rear, first, second, third, and fourth sides (6,9,10,7,8) so that all outside surfaces of the case (1) include the antimicrobial substance or treatment.

In yet a further embodiment, the first, second, third, and fourth sides (9,10,7,8) form at least part of a frame configured to surround a periphery of the mobile device when the mobile device is arranged inside the case (1). At least one of the inside surfaces of the first, second, third, and fourth sides (9,10,7,8) includes triangular protrusions (4) that have a triangular cross section and extend toward the inside of the case, so that an apex of each of the triangular protrusions (4) contacts the mobile device when it is arranged inside the case.

In another embodiment, at least two of the inside surfaces of the first, second, third, and fourth sides (9,10,7,8) include the triangular protrusions (4).

In yet another embodiment, at least three of the inside surfaces of the first, second, third, and fourth sides (9,10,7,8) include the triangular protrusions (4).

In a further embodiment, the inside surface of the first side (9) is connected to the inside surface of the third side (7) to form a first corner, the first corner having an inside surface that includes at least one of the triangular protrusions (4).

In yet a further embodiment, the inside surface of the second side (10) is connected to the inside surface of the third side (7) to form a second corner, the second corner having an inside surface that includes at least one of the triangular protrusions (4).

In another embodiment, the inside surface of the second side (10) is connected to the inside surface of the fourth side (8) to form a third corner, the third corner having an inside surface that includes at least one of the triangular protrusions (4).

In yet another embodiment, the third layer (3) forms at least part of the inside surface of at least one of the rear, first, second, third, and fourth sides (6,9,10,7,8).

It is noted that the features of the above-described embodiments are not exclusive to each other, and that any one of the above embodiments/features can be combined with one or more of the other embodiments/features to arrive at further embodiments.

The inventive case can be designed to fit a variety of mobile devices—such as smartphones and other portable electronic devices.

BRIEF DESCRIPTION OF THE DRAWINGS

FIG. 1 is an upper side view of the case in accordance with an embodiment of the invention.

FIG. 2 is a rear view of the case in accordance with an embodiment of the invention.

FIG. 3 is a right side view of the case in accordance with an embodiment of the invention.

FIG. 4 is a left side view of the case in accordance with an embodiment of the invention.

FIG. 5 is a lower side view of the case in accordance with an embodiment of the invention.

DETAILED DESCRIPTION OF EMBODIMENTS

Figure 6:
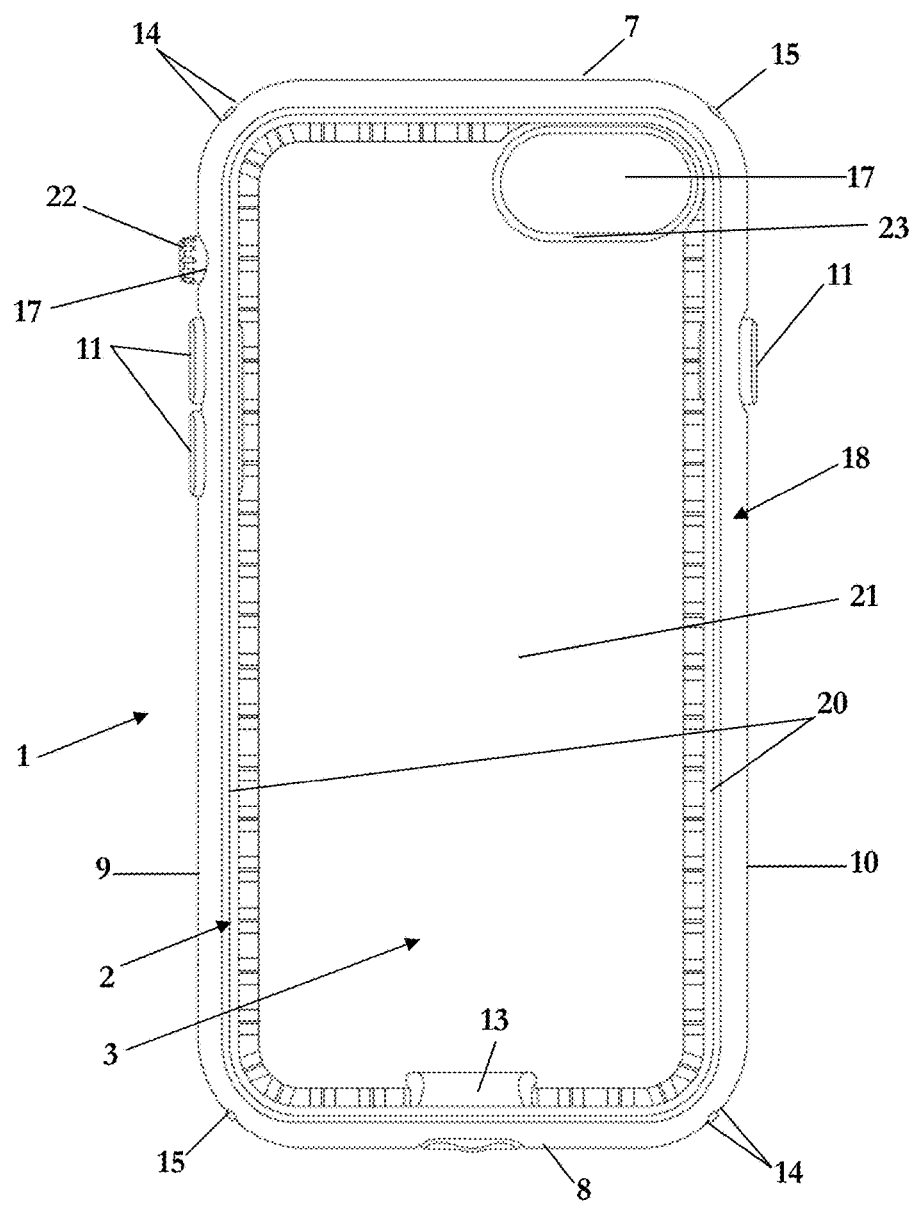
FIG. 6 is a front view of the case in accordance with an embodiment of the invention.
Figure 7:
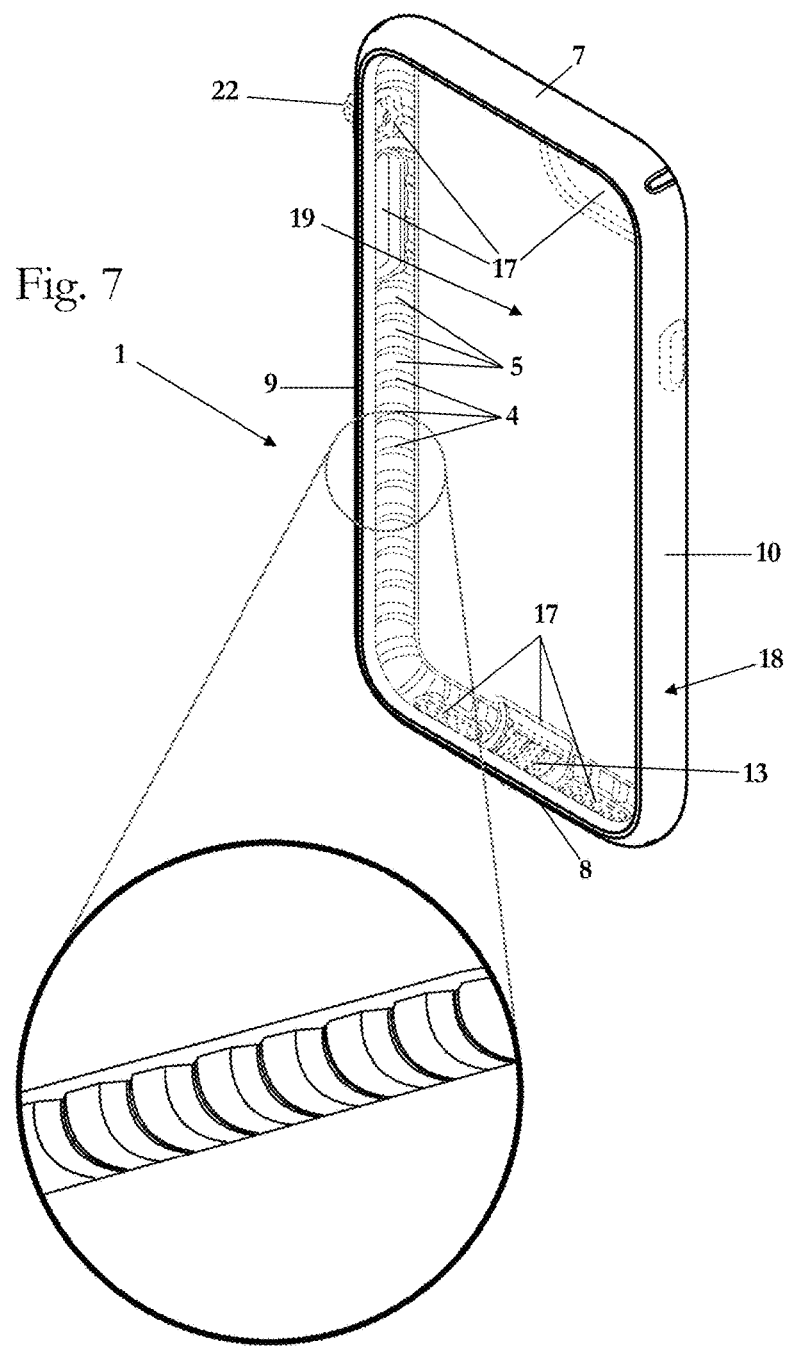
FIG. 7 is a front-right perspective view of the case in accordance with an embodiment of the invention showing an enlarged view of a portion of the case.

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments. It is noted that any numerical ranges disclosed herein are included to individually disclose every sub-range and number, both whole integer and partial fraction, within the disclosed range. For example, a disclosed range of 1-100 is intended to individually disclose 20-90, 40-80, 30.5-50.2, 20, 67.3, 84.512924, and every other range and number that falls within the recited range.

A case according to an embodiment of the invention can be arrived at by providing shock-absorbing impact geometry to the interior of the case in the form of triangular ridges that protrude from the inner surface of the sides of the case. The narrow tops of the ridges contact the surface of the device. When force is applied between the outside of the case and the device, such as during an impact event, the force causes the triangular ridges to deform against the surface of the device. As force increase, further deformation of the ridges increases the volume of deformed material. This configuration allows the case to absorb impact and reduce the forces communicated to a device within the case in the event the device and case are dropped on a hard surface.

FIGS. 1-7 show an upper side view, a rear view, a right side, a left side view, a lower side view, a front view, and a front-right perspective view, respectively, of the case in accordance with an embodiment of the invention. The case 1 includes a first layer 18, a second layer or shell 2 arranged inside the first layer 18, and a third layer 3. The first layer 18 includes a rear side having an inside surface (not shown) and an outside surface 6 opposite to the inside surface. An upper side 7, a lower side 8, a left side 9, and a right side 10 extend from the outside surface 6 of the rear side toward a front of the case 1 so as to form a pocket or recess in which the second and third layers 2,3 will be—and eventually a mobile device can be—arranged. The third layer 3 also includes a corresponding rear side having an inside surface 21, as well as one or more of corresponding upper, lower, left, and right sides, as does the second layer 2. A pocket or recess 19 may be formed in third layer 3 for receiving the mobile device.

In one embodiment, the rear sides of the first layer 18, second layer 2, and third layer 3 overlay each other. The rear sides of the first layer 18, second layer or shell 2, and third layer 3 are also preferably substantially coextensive with each other so that the rear side of each layer covers at least 50% of the surface area of the rear side of the other layer. It is also preferable that the respective upper sides, lower sides, left sides, and right sides of the first layer 18, second layer 2, and third layer 3 are substantially coextensive with each other so that the respective upper sides, lower sides, left sides, and right sides of each layer covers at least 50% of the surface area of the corresponding side of the other layer. Additionally, it is preferable that the rear of the case (formed by the rear sides of the first layer 18, second layer 2, and third layer 3) is configured to cover at least 90%, if not all, of the rear of a mobile device when the mobile device is arranged within the case.

According to another embodiment, the respective upper sides, lower sides, left sides, and right sides of the first layer 18, second layer 2, and third layer 3 are only partially coextensive with each other so that the respective upper sides, lower sides, left sides, and right sides of the first layer 18, second layer 2, and third layer 3 cover only a portion of the respective sides of each other.

The second layer or shell 2 is preferably formed from a rigid or hard material to create a rigid/hard shell which provides at least some impact protection as well as protection from being punctured by impacts with sharp objects. Examples of suitable hard/rigid materials include hardened plastic material, a rigid or semi-rigid plastic material, a rigid/hard rubber material, a polycarbonate material, a metal, an alloy, a para-aramid material, wood, glass, mirror, quartz, and any combination thereof, and may be any color or texture. Preferred materials include thermosetting plastics with a hard durometer having shore 30D to shore 100D, polycarbonate, poly(methyl methacrylate) ("PMMA"), metals, acrylonitrile butadiene styrene ("ABS"), PMMA, polyethylene terephthalate ("PET"), high durometer thermoplastic elastomers ("TPEs") and thermoplastic polyurethanes ("TPUs") having shore 30D to shore 100D, and any combination thereof. Preferably, the hard/rigid material of the shell 2 is nonelastomeric. The hard protective shell may be designed to mimic the finish of existing mobile devices, such as phones, MP3/4 players, tablets, laptops, and other mobile electronic devices. Many users like the feel of the original phone and would like to maintain that feel but still want protection for their device. The second layer 2 may additionally be formed with a lip or rim 20 so as to secure and retain the mobile device within the case 1.

The outside surface of the first layer 18 may be provided with a scratch resistant UV hardcoat, which resists scratches and prevents discoloration of the case due to UV exposure.

The first layer 18 and third layer 3 are preferably formed from a soft elastomeric material which provides at least some shock protection from impact events such as drops or falls. Examples of suitable materials include thermoplastic elastomers ("TPEs"), thermoplastic polyurethane ("TPU"), polyolefins, silicone, rubber, and any combination thereof. Forming the first layer 18 and third layer 3 from a soft elastomeric material provides the case with extra layers of protection in the event of drop, fall, or other impact event. The elastomeric first layer 18 also makes the case easier for a user to grip and hold compared to a rigid or hard outer shell, making it less likely that a user will drop the device.

The first layer 18, the third layer 3, or both, may also have an antimicrobial material coated on one or more surfaces (e.g., one or more exterior surfaces of the first layer 18 facing away from the mobile device, one or more interior surfaces of the third layer 3 facing toward the mobile device, etc.) or embedded within the layer.

Examples of antimicrobial materials include silver or silver alloy (e.g., silver sodium hydrogen zirconium phosphate), copper or copper alloy, organosilanes, quaternary ammonium compounds (e.g., dimethyloctadecyl (3-trimethoxysilyl propyl) ammonium chloride, alkyldimethylbenzylammonium chloride, and didecyldimethylammonium chloride), chlorhexidine, chlorhexidine incorporated hydroxyapatite materials, chlorhexidine-containing polymers (e.g., chlorhexidine-containing polylactide), and antibiotics (e.g., gentamicin, cephalothin, carbenicillin, amoxicillin, cefamandol, tobramycin, vancomycin).

Examples of antimicrobial coatings include coatings containing one or more of the above antimicrobial materials, chlorhexidine-containing polylactide coatings on an anodized surface, and polymer and calcium phosphate coatings with chlorhexidine.

In addition, or alternatively, the first layer 18, the third layer 3, or both may include an antimicrobial surface treatment. For example, one or more surfaces (e.g., one or more exterior surfaces of the first layer 18 facing away from the mobile device, one or more interior surfaces of the third layer 3 facing toward the mobile device, etc.) may be formed as or made to be a superhydrophobic surface—such as a low energy, generally rough surface on which water has a contact angle (i.e., the angle at which the liquid—vapor interface meets the solid—liquid interface) of >150°.

Preferably the first layer 18 is made from liquid injections silicone and has an antimicrobial coating on one or more, preferably all, outer surfaces facing away from a mobile device arranged within the case. This helps to keep the outside of the case clean and reduce/minimize the presence of microbes (e.g., bacteria, fungi, viruses, etc.), thereby helping to prevent the hand-to-hand spread of related sicknesses, illnesses, or diseases.

Figure 11:
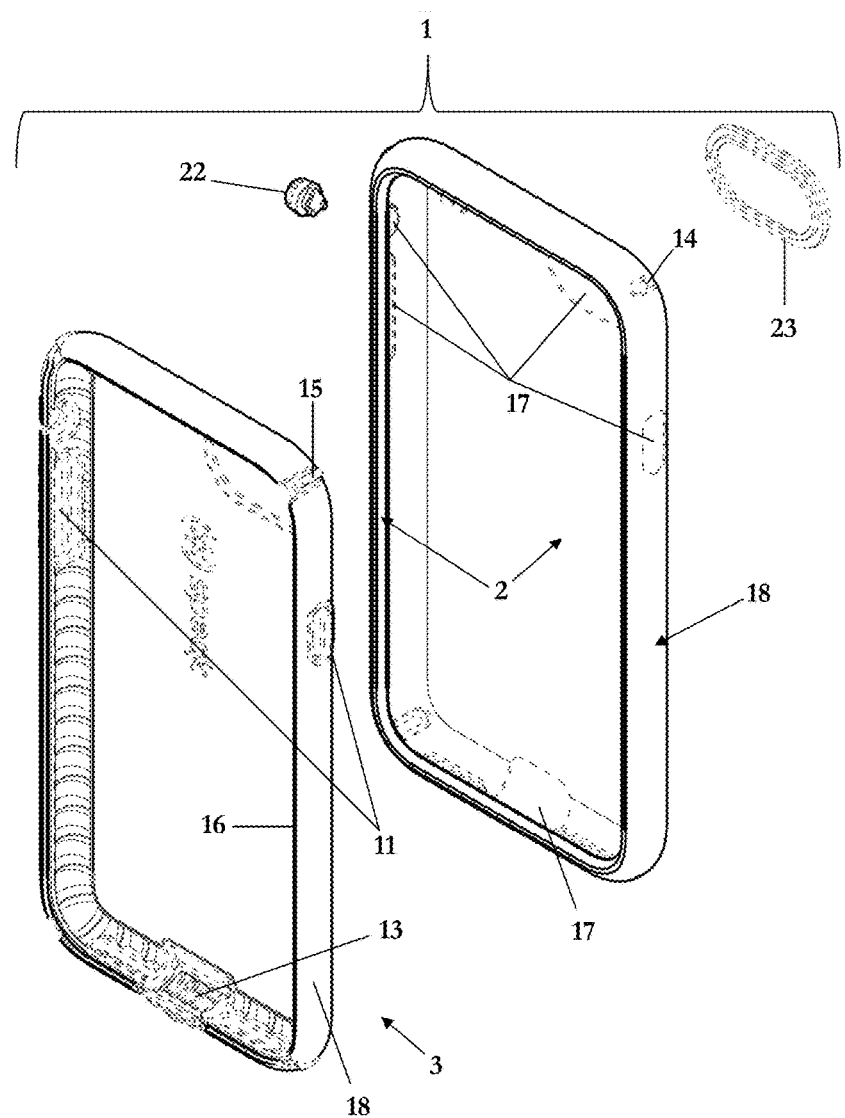
FIG. 11 is an exploded perspective view in accordance with an embodiment of the invention.

The third layer 3 may also be designed so that there are no gaps between the rear of the mobile device and the inside surface 21 of the rear side of the case. This enables the case to have a very solid connection to the phone. The third layer 3 may additionally be formed with a lip or rim 16 so as to secure and retain the mobile device within the case 1. The elastomeric first layer 18 and/or third layer 3 also can be formed to have portions 11 designed to cover buttons on a mobile device. This allows a user to simply press the exposed portion 11 corresponding to the desired input of the mobile device. And the elastomeric first layer 18 or third layer 3 may be formed to have one or more gaskets 13 around or covering one or more corresponding openings 17. For example, as shown in FIG. 11, the third layer 3 can have a gasket 13 that covers an opening 17 for a charging port, audio port, data port, or other electrical port of the mobile device. The gasket 13 may opened to provide access to the corresponding port, and closed to protect the port from physical damage and to prevent dust and debris from getting into the port.

The case 1 may also include a cover or knob 22 to cover one or more openings 17. For example, the case 1 can include a knob 22 that covers an opening 17 for a switch on the mobile device. The knob 22 can be rotated to activate the switch underneath. This protects the switch from physical damage and prevents dust and debris from getting into the case 1, while still allowing a user to easily manipulate the switch.

In an especially preferred embodiment, all openings 17 in the case, other than the opening for the screen of the mobile device, are covered by a gasket 13 or a cover 22. This provides protection for all exposed features (e.g., ports, switched, buttons, etc.) of a mobile device when it is arranged in the case.

Either or both of the first layer 18 and third layer 3 may also, or alternatively, be formed from a non-Newtonian dilatant material. The dilatant material is soft and flexible when at rest, but stiffens and/or hardens upon impact. In this way, the dilatant material is able to provide both impact protection by dispersing the force of an impact event along the surface of the first layer 18 and/or third layer 3, and shock protection by absorbing some of the shock force of the impact event. This dual quality (i.e., absorbing and diffusing impact or impact forces) of the dilatant material allows for less material to be used to make the case—allowing for a thinner, lighter, and less bulky case which increases the portability of the protected mobile device—while still providing increased impact and shock protection to the mobile device encased therein.

Examples of suitable dilatant materials for the first layer 18 and/or third layer 3 include materials made by D3O® (such as D3O® ST, D3O® XT, D3O® Shock+, and D3O® Aero), PORON® XRD™ made by Rogers Corporation, and ARTi-LAGE™ artificial cartilage foam made by ARTi-LAGE™. Impact absorbing materials (such as foams) which have dilatant properties are especially preferred.

The dilatant material may have a hardness of at least 20 Shore OO, or may have a hardness of at least 5 Shore O. Preferably the hardness is at least 30 Shore OO, at least 50 Shore OO, at least 60 Shore OO, or at least 70 Shore OO. More preferably the hardness is in a range of 20-90 Shore OO, or in a range of 5-61 Shore O. More preferably still, the hardness is in a range of 30-80 Shore OO, or in a range of 5-40 Shore O. Even more preferably, the hardness is in a range of 40-70 Shore OO.

Preferably the first layer 18 and/or third layer 3 has a hardness in the range of from 60-85 Shore A. If the first layer 18 and/or third layer 3 is clear, its preferred hardness is 75-85 Shore A. If the first layer 18 and/or third layer 3 is opaque, its preferred hardness is 60-75 Shore A.

Each of the first layer 18, second layer 2, and rear side of the third layer 3 is 0.5-4.0 mm thick. Preferably one or more of the layers is 0.6-3.0 mm thick. More preferably, one or more of the layers is 0.8-2.0 mm thick. Even more preferably, one or more of the layers is 0.9-1.3 mm thick.

Figure 8:
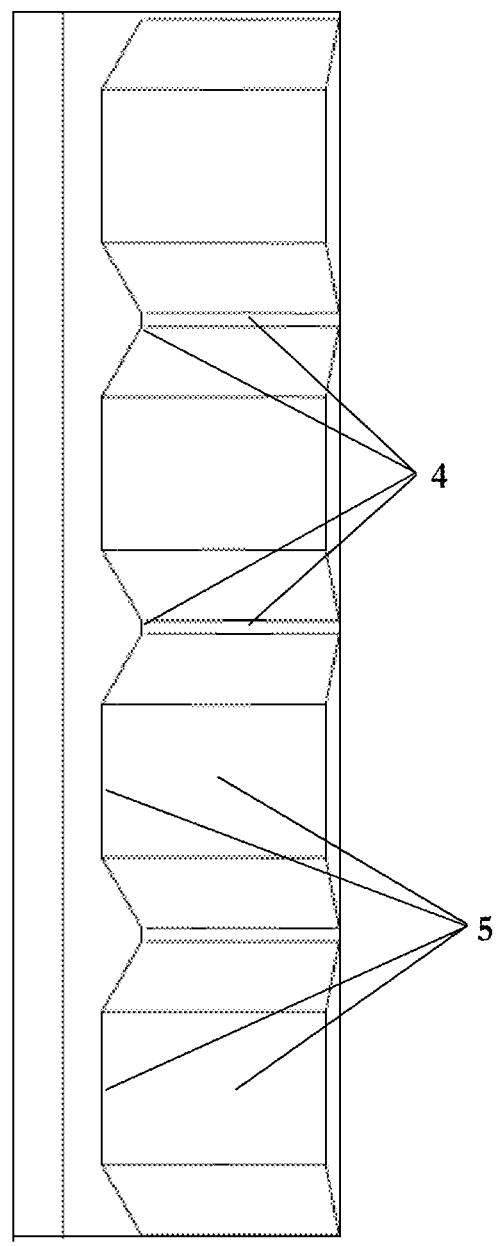
FIG. 8 shows a close-up view of the shock-absorbing triangular ridges 4 that protrude from the inner surface of the sides of the case, and the troughs 5 located between the triangular ridges 4.

The case 1 includes shock-absorbing impact geometry in the form of triangular ridges 4 that protrude from the inner surface of one or more sides of the case 1. Between each triangular ridge 4 is a trough 5. The triangular ridges 4 are formed by the third layer 3, and so are made of the elastomeric or non-Newtonian dilatant material of the third layer 3. FIG. 8 shows a close-up view of a section of the third layer 3 with the triangular ridges 4 and the troughs 5. This unique series of triangular ridges 4 act as a shock barrier and dissipate impact forces.

The triangular shape of the ridges 4 absorbs shock. The triangular ridges deform when force is applied between the surface of the device and the hard layer 3. The triangular shaped ridges deform in a different manner than semicircular or rectilinear protrusions, which may provide improved absorption of energy and less communication of forces to the device due to impact than protrusions of other shapes. In particular, as the triangular ridges 4 of the current invention compress and deform between the mobile device and the case upon impact, the surface area of the triangular ridges 4 gradually increase.

Figure 9:
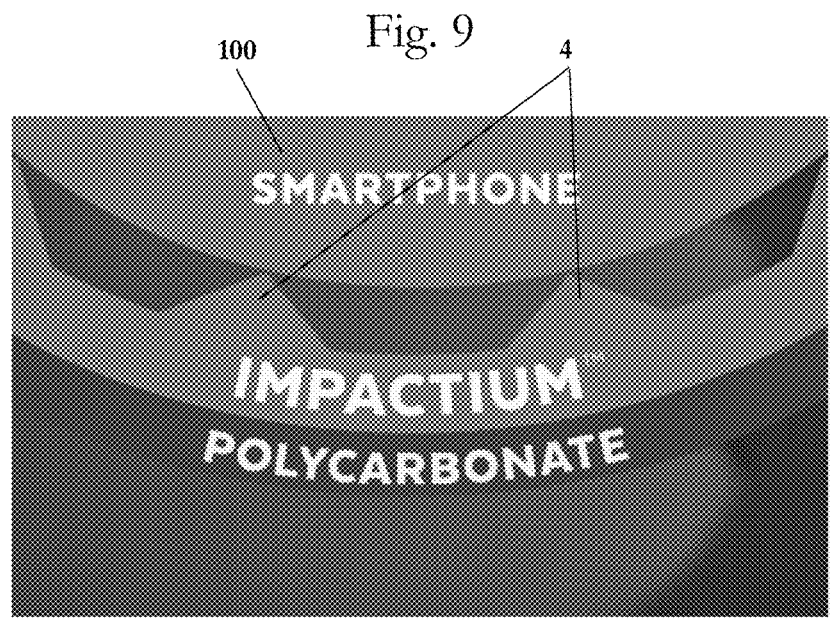
FIG. 9 shows a close-up cut-away view of the case 1 with a mobile device arranged therein prior to impact.
Figure 10:
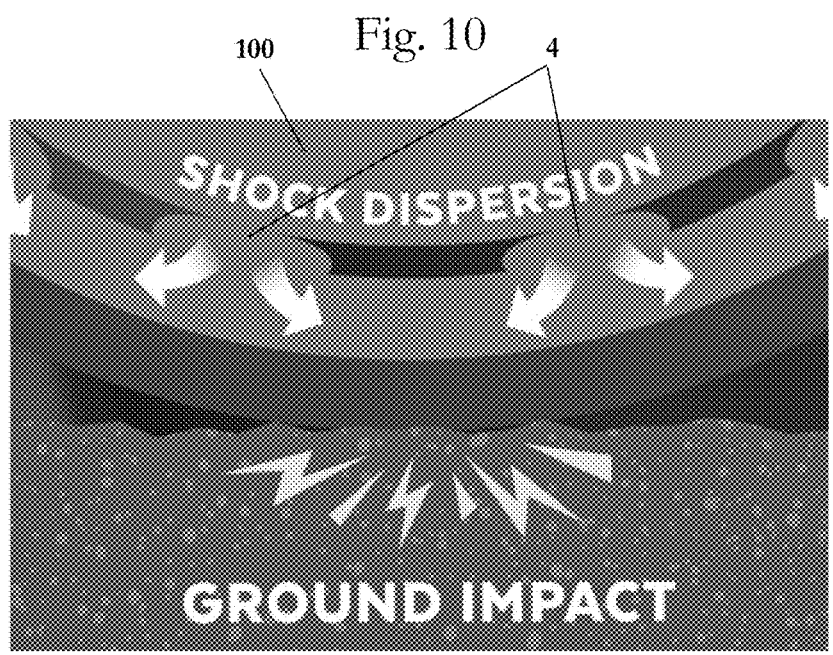
FIG. 10 shows a close-up cut-away view of the case 1 with a mobile device arranged therein during impact.

As shown in FIG. 9, the triangular ridges 4 only slightly contact the mobile device 100 arranged in the case 1. During impact, as shown in FIG. 10, the triangular ridges 4 compress against the mobile device 100, gradually changing shape (in cross section) from a triangular shape to a trapezoidal shape, and eventually to a rectilinear shape. This gradual change in cross-sectional shape of the triangular ridges 4 means that the shock-absorbing capability of the ridges 4 increases non-linearly—first due to the properties of the ridge material itself as it compresses and absorbs shock (i.e., the same way a solid and smooth layer of that material would absorb shock upon compression), and second due to the change in cross-sectional shape independent of the ridge material. The gradual change in cross-sectional shape of the triangular ridges 4 provides a slower decrease in velocity (i.e., a lower deceleration) of the mobile device during impact as compared to a semi-circular shape (which quickly becomes rectilinear) and a rectilinear shape (which is doesn't change its type of shape and merely compresses). Such a reduced deceleration results in less shock being absorbed by the mobile device, as it is instead absorbed by the gradual change in cross-sectional shape of the triangular ridges 4.

According to some embodiments the triangular ridges 4 protrude from the troughs 5 at a distance in the range of 0.300-4.00 mm, preferably 0.400-3.00 mm, more preferably 0.500-2.00 mm, and most preferably 0.600-1.50 mm. In one preferred embodiment, the distance between the surface of the troughs 5 and the tip of the triangular ridges 4 is around 1.00 mm.

The first layer 18, second layer 2, and third layer 3 may be co-molded/co-casted together or otherwise permanently affixed to each other, such as with an adhesive.

Alternatively, the first layer 18, second layer 2, and third layer 3 may be separable from one another as two or three distinct pieces. In such an instance, the separable pieces can be configured so that they mechanically engage with each other to form a unitary case. For example, the first layer 18 and/or second layer 2 may be designed with slots or cutouts 14 into which corresponding ridges or ribs 15 of the third layer 3 engage (e.g., by snapping, pressure fitting, or any other suitable mechanical engagement). As another example opposite sides of the first layer 18 (e.g., upper side 7 and lower side 8, left side 9 and right side 10, or both) may be designed to snap onto and hold the second layer 2 and/or the third layer 3. Similarly, opposite sides of the second layer 2 (e.g., upper side and lower side, left side and right side, or both) may be designed to snap onto and hold the third layer 3. In this way, the case 1 can be formed so that (1) the first and second layers 18,2 are permanently attached to each other as one piece with the third layer being removable therefrom, (2) the second and third layers 2,3 are permanently attached to each other as one piece with the first layer being removable therefrom, (3) the first layer 18 is permanently attached to the second layer 2 which is in turn permanently attached to the third layer 3, or (4) the first layer 18 is removably attached to the second layer 2 which is in turn removably attached to the third layer 3.

For example, one process for producing the case may be:
1. Mold the first layer 18;
2. Place the first layer 18 into the overmold tool, and mold the second layer 2 onto the first layer 18; and
3. Place the first and second layers 18,2 into the overmold tool, and mold the third layer 3 onto the second layer 2.

Another example of a process for producing the case may be:
1. Mold the third layer 3;
2. Place the third layer 3 into the overmold tool, and mold the second layer 2 onto the third layer 3; and
3. Place the second and third layers 2, 3 into the overmold tool, and mold the first layer 18 onto the second layer 2.

And another example of a process for producing the case may be:
1. Mold the second layer 2; and
2. Either:
   2a. Place the second layer 2 into the overmold tool, and mold the first layer 1 onto the second layer 2; and
   2b. Place the first and second layers 18,2 into the overmold tool, and mold the third layer 18 onto the second layer 2.
3. Or:
   3a. Place the second layer 2 into the overmold tool, and mold the third layer 3 onto the second layer 2; and
   3b. Place the second and third layers 2,3 into the overmold tool, and mold the third layer 18 onto the second layer 2.

Yet another example of a process for producing the case may be:
1. Mold the first layer 18;
2. Mold the second layer 2 (separately from, and before, after, or simultaneously with, the first layer 18); and
3. Mold the third layer 3 (separately from, and before, after, or simultaneously with, either or both of the first layer 18 and second layer 2); and
4. Join together the first layer 18, the second layer 2, and the third layer 3 (in any order).

As yet another example, two of the three layers may be co-molded/co-casted or overmolded as described above, the remaining layer molded separately, and the two layers and other layer joined together.

It is noted that additional openings or cutouts 17 may be provided in at least a part of the case 1 so as to allow various buttons, ports, or features of a protected mobile device to be accessed without having to remove the mobile device from the case 1. For example openings or cutouts 17 may be provided to allow a user to engage a button of the protected mobile device either directly or via the cover portion 11. As another example, cutouts 17 may be provided to create an opening in the case 1 though which a charging port, audio port, data port, or other electrical port of the mobile device may be accessed, either directly or via a pass-through connection. As yet another example, cutouts 17 may be provided to create an opening to expose a camera lens (e.g., a cutout 17 for a camera lens and/or flash aperture ring 23), audio speaker, microphone, or other feature of the device to be accessed or employed without removing the mobile device from the case 1.

In one embodiment, at least a portion of each of the first layer 18, the second layer 2, and the third layer 3, corresponding to the rear of the case 1, is translucent, transparent, or clear, with a visible light transmittance (VLT) of at least 20%, so that the rear of a mobile device arranged in the case can be seen by a user through the first layer 18, the second layer 2, and the third layer 3. Preferably, the portions of the first layer 18, the second layer 2, and the third layer 3, corresponding to the rear of the mobile device, are translucent or clear. For example, at least a portion, if not all, of the first layer 18 may have a VLT of at least 20%, preferably at least 50%, more preferably at least 80%, more preferably still at least 90%, and most preferably 100%. Similarly, at least a portion, if not all, of the second layer 2 (and/or the third layer 3) may have a VLT of at least 20%, preferably at least 50%, more preferably at least 80%, more preferably still at least 90%, and most preferably 100%.

It is noted that the terminology used above is for the purpose of reference only, and is not intended to be limiting. For example, terms such as "upper", "lower", "above", "below", "rightward", "leftward", "clockwise", and "counterclockwise" refer to directions in the drawings to which reference is made. As another example, terms such as "inward" and "outward" may refer to directions toward and away from, respectively, the geometric center of the component described. As a further example, terms such as "front", "rear", "side", "left side", "right side", "top", "bottom", "horizontal", and "vertical" describe the orientation of portions of the component within a consistent but arbitrary frame of reference which is made clear by reference to the text and the associated drawings describing the component under discussion. Such terminology will include the words specifically mentioned above, derivatives thereof, and words of similar import.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

In addition, it is noted that citation or identification of any document in this application is not an admission that such document is available as prior art to the present invention.

The invention claimed is:

1. A case for a mobile device, comprising:
a first layer formed from an elastomeric first material;
a second layer formed from a second material different from the elastomeric first material; and
a third layer formed from an elastomeric third material different from the second material,
wherein the second layer is arranged between the first layer and the third layer, with the first layer arranged on an outside of the case and the third layer arranged on an inside of the case so that the third layer is closer to the mobile device than the first layer when the mobile device is arranged in the case,
wherein the third layer includes an inside surface forming protrusions each having an apex and extending toward the inside of the case so that the apex of each of the protrusions contacts the mobile device when the mobile device is arranged inside the case, and
wherein at least one outer surface of the first layer includes an antimicrobial substance or treatment selected from the group consisting of silver and silver alloys, copper and copper alloys, organosilanes, quaternary ammonium compounds, chlorhexidine, chlorhexidine incorporated hydroxyapatite materials, chlorhexidine-containing polymers, and antibiotics.

2. The case for a mobile device according to claim 1, wherein at least part of the at least one outer surface of the first layer is a superhydrophobic surface on which water has a contact angle of >150°.

3. The case for a mobile device according to claim 1, wherein the elastomeric first and third materials are the same or different, with each comprising at least one material selected from the group consisting of thermoplastic elastomers, thermoplastic polyurethane, silicone, rubber, and combinations thereof.

4. The case for a mobile device according to claim 1, wherein the elastomeric first material comprises silicone.

5. The case for a mobile device according to claim 1, wherein the second material comprises at least one material selected from the group consisting of hardened plastic materials, rigid or semi-rigid plastic materials, rigid rubber materials, polycarbonate materials, metals, alloys, para-aramid materials, wood, glass, mirror, quartz, and combinations thereof.

6. The case for a mobile device according to claim 1, wherein the case is configured for completely covering the mobile device, except for at least a portion of the front and at least one speaker of the mobile device if present, when the mobile device is arranged in the case.

7. The case for a mobile device according to claim 1, further comprising:
a rear side that has an inside surface and an outside surface opposite to the inside surface;
a first side that extends from the rear side and has an inside surface and an outside surface opposite to the inside surface;
a second side that extends from the rear side and has an inside surface and an outside surface opposite to the inside surface;
a third side that extends from the rear side and has an inside surface and an outside surface opposite to the inside surface; and
a fourth side that extends from the rear side and has an inside surface and an outside surface opposite to the inside surface,
wherein the inside surface of the first side faces toward the inside surface of the second side, wherein the inside surface of the third side faces toward the inside surface of the fourth side, wherein the first and second sides are arranged between the third and fourth sides, and the third and fourth sides are arranged between the first and second sides, so that the rear side and the first, second, third, and fourth sides form a pocket configured to hold the mobile device, and wherein the outer surface of the first layer forms at least part of each of the outside surfaces of the rear, first, second, third, and fourth sides so that all outside surfaces of the case include the antimicrobial substance or treatment.

8. The case for a mobile device according to claim 7, wherein the first, second, third, and fourth sides form at least part of a frame configured to surround a periphery of the mobile device when the mobile device is arranged inside the case, and wherein at least one of the inside surfaces of the first, second, third, and fourth sides includes the protrusions, and wherein the protrusions have a triangular cross-section.

9. The case for a mobile device according to claim 8, wherein at least two of the inside surfaces of the first, second, third, and fourth sides include the protrusions.

10. The case for a mobile device according to claim 9, wherein at least three of the inside surfaces of the first, second, third, and fourth sides include the protrusions.

11. The case for a mobile device according to claim 8, wherein the third layer forms at least part of the inside surfaces of at least one of the rear, first, second, third, and fourth sides.

12. A case for a mobile device, comprising:
a first layer formed from an elastomeric first material;
a second layer formed from a second material different from the elastomeric first material;
a third layer formed from an elastomeric third material different from the second material, wherein the second layer is arranged between the first layer and the third layer, with the first layer arranged on an outside of the case and the third layer arranged on an inside of the case so that the third layer is closer to the mobile device than the first layer when the mobile device is arranged in the case;
a rear side that has an inside surface and an outside surface opposite to the inside surface;
a first side that extends from the rear side and has an inside surface and an outside surface opposite to the inside surface;
a second side that extends from the rear side and has an inside surface and an outside surface opposite to the inside surface;
a third side that extends from the rear side and has an inside surface and an outside surface opposite to the inside surface; and
a fourth side that extends from the rear side and has an inside surface and an outside surface opposite to the inside surface, wherein the inside surface of the first side faces toward the inside surface of the second side, wherein the inside surface of the third side faces toward the inside surface of the fourth side, wherein the first and second sides are arranged between the third and fourth sides, and the third and fourth sides are arranged between the first and second sides, so that the rear side and the first, second, third, and fourth sides form a pocket configured to hold the mobile device, wherein the inside surface of the first side is connected to the inside surface of the third side to form a first corner, the first corner having an inside surface that includes a protrusion having a triangular cross-section and forming an apex, the protrusion extending toward the inside of the case so that the apex of the protrusion contacts the mobile device when the mobile device is arranged inside the case, and wherein the outside surface of at least one of the first side, the second side, the third side, and the fourth side includes an antimicrobial substance or treatment.

13. The case for a mobile device according to claim 12, wherein the inside surface of the second side is connected to the inside surface of the third side to form a second corner, the second corner having an inside surface that includes at least one of the protrusions.

14. The case for a mobile device according to claim 12, wherein the inside surface of the second side is connected to the inside surface of the fourth side to form a third corner, the third corner having an inside surface that includes at least one of the protrusions.

15. The case for a mobile device according to claim 12, wherein the antimicrobial substance or treatment is selected from the group consisting of silver and silver alloys, copper and copper alloys, organosilanes, quaternary ammonium compounds, chlorhexidine, chlorhexidine incorporated hydroxyapatite materials, chlorhexidine-containing polymers, and antibiotics.

16. The case for a mobile device according to claim 12, wherein the elastomeric first and third materials are the same or different, with each comprising at least one material selected from the group consisting of thermoplastic elastomers, thermoplastic polyurethane, silicone, rubber, and combinations thereof.

17. The case for a mobile device according to claim 12, wherein the elastomeric first material comprises silicone.

18. The case for a mobile device according to claim 12, wherein the second material comprises at least one material selected from the group consisting of hardened plastic materials, rigid or semi-rigid plastic materials, rigid rubber materials, polycarbonate materials, metals, alloys, para-aramid materials, wood, glass, mirror, quartz, and combinations thereof.

* * * * *